United States Patent
Dall'Occo et al.

(10) Patent No.: US 6,448,350 B1
(45) Date of Patent: *Sep. 10, 2002

(54) PROCESS FOR THE PREPARATION OF COPOLYMERS OF ETHYLENE WITH ALPHA-OLEFINS

(75) Inventors: Tiziano Dall'Occo; Luigi Resconi, both of Ferrara (IT)

(73) Assignee: Basell Technology Company BV, Hoofddorp (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,191
(22) PCT Filed: Apr. 13, 1999
(86) PCT No.: PCT/EP99/02644
§ 371 (c)(1),
(2), (4) Date: Dec. 17, 1999
(87) PCT Pub. No.: WO99/54369
PCT Pub. Date: Oct. 28, 1999

(30) Foreign Application Priority Data

Apr. 21, 1998 (EP) .............................. 98201287

(51) Int. Cl.⁷ ................................. C08F 4/44
(52) U.S. Cl. .................... 526/160; 526/159; 526/348.2; 526/348.5; 526/348.6
(58) Field of Search ................ 526/160, 159, 526/348.2, 348.5, 348.6

(56) References Cited

U.S. PATENT DOCUMENTS

| | | |
|---|---|---|
| 5,001,205 A | 3/1991 | Hoel |
| 5,304,614 A | 4/1994 | Winter et al. |

FOREIGN PATENT DOCUMENTS

| | | |
|---|---|---|
| EP | 0 700 937 A2 | 5/1990 |
| EP | 0 537 686 A1 | 10/1992 |
| EP | 0 633 272 A1 | 6/1994 |
| EP | 0 722 949 A2 | 7/1996 |
| EP | 0 722 950 A1 | 7/1996 |
| EP | 0 745 615 A1 | 12/1996 |
| JP | 06192274 | * 7/1994 |
| WO | WO 92/00333 | 1/1992 |
| WO | WO 95/26369 | 10/1995 |
| WO | WO 95/32995 | 12/1995 |
| WO | WO 96/22995 | 8/1996 |
| WO | WO 98/22995 | * 8/1996 |
| WO | WO 98/43931 | 10/1998 |
| WO | WO 98/43989 | 10/1998 |
| WO | WO 99/36427 | 7/1999 |

OTHER PUBLICATIONS

Carman, et al., "Monomer Sequence Distribution in Ethylene–Propylene Rubber Measured by $^{13}$C NMR. 3. Use of Reaction Probability Model," *Macromolecules*, vol. 10, 537 (1977).

Uozomi, et al., "Copolymerization of Olefins with Kaminsky–Sinn–Type Catalysts," *Makromol. Chem.*, vol. 193, No. 4, 823 (1992).

Nifant'ev, et al., "Synthesis of Zirconium and Hafnium ansa–Metallocenes via Transmetalation of Dielement–Substituted Bis(cyclopentadienyl) and Bis(indenyl) Ligands," *Organometallics*, vol. 16, pp. 713–715 (1997).

Randall, "A Review of High Resolution Liquid $^{13}$Carbon Nuclear Magnetic Resonance Characterizations of Ethylene– Based Polymers," *Macromol Chem. Phys.*,vol. 29, 201 (1989).

Derwent English language abstract of EP 700 937 A2 (document B3).

Polymer Handbook, 2nd Edition (Edited by J. Brandrup et al, 1975, Section II 192–195).*

* cited by examiner

Primary Examiner—David W. Wu
Assistant Examiner—W Cheung
(74) Attorney, Agent, or Firm—Bryan Cave LLP

(57) ABSTRACT

Ethylene based copolymers having high molecular weights, narrow molecular weight distributions, and a very good homogeneous distribution of the comonomer units can be obtained in high yields at temperatures of industrial interest, by carrying out the polymerization reaction in the presence of metallocene catalysts comprising particular bridged bis-indenyl compounds substituted in the 3-position on the indenyl groups.

17 Claims, No Drawings

PROCESS FOR THE PREPARATION OF COPOLYMERS OF ETHYLENE WITH ALPHA-OLEFINS

The present invention relates to a process for the preparation of copolymers of ethylene with alpha-olefins.

Metallocene compounds with two bridged cyclopentadienyl groups are known as catalyst components for the homo- and copolymerization reaction of olefins.

For exanmle, U.S. Pat. No 5,001,205 discloses the prepa ration of copolymers of ethylene with alpha-olefins in the presence of a catalytic system comprising a bis-cyclopentadienyl compound of Zr, Ti and Hf and methylalumoxane (MAO) as cocatalyst. The working examples describe the copolymerization of ethylene with propylene in the presence of bridged or unbridged (tetrahydroindenyl) zirconium dichloride.

Although the homogeneity of the alpha-olefin distribution in the chain is improved with respect to copolymers obtained from conventional titanium- or vanadium-based Ziegler-Natta type catalysts, it is still not satisfactory and a further improvement is highly desirable. Metallocene compounds having two cyclopentadienyl moieties bridged by a single atom are also known.

For example, PCT application WO 96/22995 discloses a class of single carbon bridged metallocenes, and their use in catalysts for the polymerization of olefins, particularly of propylene. The class of metallocene compounds which is indicated as especially suitable for use in propylene polymerizations is that of the single-carbon-bridged bis-indenyls wherein the indenyl moieties are substituted in the 3-position with carbon, silicon or germanium atoms having three hydrocarbon substituents. Neither are reported examples of copolymerizations of ethylene with an alpha-olefin, nor is given any information about the properties of the obtainable ethylene copolymers. Particularly, there are no data about the comonomer distribution along the polymer chain.

It would be desirable to select catalysts capable of yielding ethylene copolymers having an improved homogeneity of the distribution of the comonomer units along the polymer chain. It has now been unexpectedly found that it is possible to prepare ethylene-based copolymers having high molecular weight, and in which the distribution of the comonomer units in the polymeric chain is extremely homogeneous, operating at temperatures of industrial interest, by carrying out the polymerization reaction of ethylene in the presence of metallocene catalysts comprising particular single atom bridged bis-indenyl compounds substituted in the 3-position on the indenyl group.

Therefore, according to a first aspect, the present invention provides a process for the preparation of copolymers of ethylene, comprising the polymerization reaction of ethylene with at least one comonomer selected from alpha-olefin, cycloolefins and polyenes, in the presence of a catalyst comprising the product obtainable by contacting:

(A) A Metallocene Compound of the Formula (I):

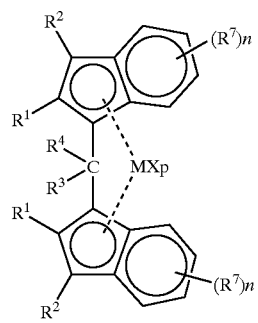

(I)

wherein substituents $R^1$ are hydrogen atoms or $C_1$–$C_{20}$-alkyl groups, substituents $R^2$ are $CHR^{10}R^{11}$, $SiR^{12}R^{13}R^{14}$ or $GeR^{15}R^{16}R^{17}$ groups, wherein: $R^{10}$, $R^{11}$, $R^{12}$, $R^{15}$ are hydrogen atoms, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optionally silicon or germanium atoms;

$R^{13}$, $R^{14}$, $R^{16}$, $R^{17}$ are $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optionally containing silicon or germanium atoms;

$R^3$ and $R^4$, same or different, are hydrogen atoms or —$CHR^5R^6$ groups;

$R^3$ and $R^4$ can form a ring having 3 to 8 carbon atoms which can contain hetero atoms;

$R^5$ and $R^6$, same or different, are hydrogen atoms, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, which can form a ring having 3 to 8 carbon atoms which can contain hetero atoms;

the $R^7$ substituents, same or different, are a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing silicon or germanium atoms; and optionally two adjacent $R^7$ substituents can form a ring comprising from 5 to 8 carbon atoms, n being an integer from 0 to 4;

M is an atom of a transition metal selected from those belonging to group 3, 4, 5, 6 or to the lanthanide or actinide groups in the Periodic Table of the Elements (new IUPAC version), X, same or different, is a monoanionic ligand, such as a hydrogen atom, a halogen atom, an $R^8$, $OR^8$, $OSO_2CF_3$, $OCOR^8$, $SR^8$, $NR^8_2$ or $PR^8_2$ group, wherein the substituents $R^8$ are a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-aryl-alkyl radical, optionally containing silicon or germanium atoms;

p is an integer of from 0 to 3, being equal to the oxidation state of the metal M minus two; and (B) An Alumoxane and/or a Compound Capable of Forming an Alkyl Metallocene Cation.

The transition metal M is preferably selected from titanium, zirconium and hafnium.

The X substituents are preferably chlorine atoms or methyl groups.

The $R^1$ and $R^7$ substituents are preferably hydrogen atoms.

Non-limiting examples of metallocene compounds suitable for use in the process of the invention are:

methylene-bis(3-methyl-indenyl)zirconium dichloride and dimethyl;

isopropylidene-bis(3-methyl-indenyl)zirconium dichioride and dimethyl;

methylene-bis(3-ethyl-indenyl)zirconium dichloride and dimethyl;

isopropylidene-bis(3-ethylndenyl)zirconium dichloride and dimethyl;

methylene-bis(3-dimethylsilyl-indenyl)zirconium dichloride and dimethyl;

isopropylidene-bis(3-dimethylsilyl-indenyl)zirconum dichioride and dimethyl;

methylenie-bis(3-dimethylgermnyl-indenyl)zirconium dichioride and dimethyl;

isopropylidene-bis(3-dimethylgermyl-indenyl) zirconiumn dichioride and dimethyl;

methylene-bis(3-trimethylsilyl-indenyl)zirconium dichloride and dimethyl;

isopropylidene-bis(3-trimethylsilyl-indenyl)zirconium dichioride and dimethyl;

methylene-bis(3-triethylsilyl-indenyl)zirconium dichloride and dimethyl;

isopropylidene-bis(3-triethylsyl-indenyl)zirconium dichloride and dimethyl;

methylene-bis(3-trimethylgermylindenyl)zircornum dichioride and dimethyl;

isopropylidene-bis(3-trimethylermyl-indenyl)zirconium dichioride and dimethyl;

methylene-bis(3-diphenylsilyl-indenyl)zirconium dichloride and dimethyl;

isopropylidene-bis(3-diphenylsilyl-indenyl)zirconium dichloride and dimethyl;

methylenc-bis(3-diethylsilyl-indenyl)zirconium dichloride and dimethyl;

isopropylidene-bis(3-diethylsilyl-indenyl)zirconium dichloride and dimethyl;

methylene-bis(2-methyl-3-trimethylsilyl-indenyl) zirconium dichloride and dimethyl;

isopropylidene-bis(2-methyl-3-trimethylsilyl-indenyl) zirconium dichloride and dimethyl;

methylene-bis(2-methyl-3-diethylsilyl-indenyl)zirconium dichloride and dimethyl;

isopropylidene-bis(2-methyl-3-diethylsilyl-indenyl) zirconium dichloride and dimethyl;

methylene-bis(3-benzylsilyl-indenyl)zirconium dichloride and dimethyl;

isopropylidene-bis(3-benzylsilyl-indenyl)zirconium dichloride and dimethyl;

methylene-bis(3-cyclopentylsilyl-indenyl)zirconium dichioride and dimethyl;

isopropylidene-bis(3-cyclopentylsilyl-indenyl)zirconium dichloride and dimethyl;

methylene-bis(2-ethyl-3-diethylsilyi-indenyl)zirconiun dichloride and dimethyl;

isopropylidene-bis(2-ethyl-3-diethylsilyl-indenyl) zirconium dichloride and dimethyl.

In the metallocene compound of formula (I) in which $R^2$ is a $CHR^{10}R^{11}$ group, preferably $R^{10}$ is different from a hydrogen atom. More preferably, both $R^{10}$ and $R^{11}$ are different from an hydrogen atom.

Particularly interesting metallocenes of formula (I) for use in the process of the invention are those in which $R^1$ is an hydrogen atom and $R^2$ is a $CHR^{10}R^{11}$ group.

Non-limiting examples belonging to this class are:

methylene-bis(3-isopropyl-indenyl)zirconium dichloride and dimethyl;

isopropylidene-bis(3-isopropyl-indenyl)zirconium dichloride and dimethyl;

methylene-bis(3-isobutyl-indenyl)zirconium dichloride and dimethyl;

isopropylidene-bis(3-isobutyl-indenyl)zirconium dichloride and dimethyl;

methylene-bis(3-isopentyl-indenyl)zirconium dichloride and dimethyl;

isopropylidene-bis(3-isopentyl-indenyl)zirconium dichloride and dimethyl;

methylene-bis(3-diphenylmethyl-indenyl)zirconium dichloride and dimethyl;

isopropylidene-bis(3-diphenylmetliyl-indenyl)zirconium dichloride and dimethyl;

methylene-bis(3-biscyclohexylmethyl-indenyl)zirconium dichloride and dimethyl;

isopropylidene-bis(3-biscyclohexylmethyl-indenyl) zirconium dichloride and dimethyl.

Most preferably the metallocene compounds of formula (I) are methylene-bis(3-isopropyl-indenyl)zirconium dichloride and isopropylidene-bis(3-isopropyl-indenyl)zirconium dichloride.

The metallocene compounds of formula (I) can be prepared by reaction of the corresponding indenyl ligands with a compound capable of forming delocalized anion on the cyclopentadienyl ring, and with a compound of formula $MX_{p+2}$, wherein M, X and p are defined as above.

The ligands of formula (I) can be prepared by different methods. A particularly suitable method for preparing the ligands of formula (I) wherein $R^3$ and $R^4$ are hydrogen atoms is described in European Patent Application No. 97200933.6, in the name of the same Applicant. A particularly suitable method for preparing the ligands of formula (I) wherein the substituents $R^3$ and $R^4$ are different from hydrogen atoms is described in EP-A 0 722 949.

In the case in which at least one substituent X in the metallocene compound of the formula (I) which is to be prepared is other than a halogen, it is necessary to substitute at least one substituent X in the metallocene obtained by at least one substituent X other than a halogen. The reaction of substituting substituents X by substituents X other than a halogen is carried out using generally applied methods. For example, if the desired substituents X are alkyl groups, the metallocenes can be made to react with alkylhnagnesium halides (Grignard reagents) or with alkyllithium compounds.

In the catalyst used in the process according to the invention, both the metallocene compound of the formula (I) and the alumoxane can be present as the product of the reaction with an organometallic aluminium compound of the formula $AlR^9{}_3$ or $Al_2R^9{}_6$, in which the $R^9$ substituents, same or different, are defined as the substituents R or are halogen atoms. The alumoxanes used in the process of the present invention may be obtained by contacting water with an organometallic compound of aluminium of formula $AlR^9_3$ or $Al_2R^9_6$, in which the $R^9$ substituents, same or different, are defined as above, with the condition that at least one $R^9$ is different from halogen. The molar ratio between the aluminium and water is in the range of 1:1 and 100:1.

Non-limiting examples of aluminium compounds of the formula $AlR^9_3$ or $Al_2R^9_6$ are:

Al(Me)$_3$, Al(Et)$_3$, AlH(Et)$_2$, Al(iBu)$_3$, AlH(iBu)$_2$, Al(iHex)$_3$, Al(iOct)$_3$, AlH(iOct)$_2$, Al(C$_6$H$_5$)$_3$, Al(CH$_2$C$_6$H$_5$)$_3$, Al(CH$_2$CMe$_3$)$_3$, Al(CH$_2$SiMe$_3$)$_3$, Al(Me)$_2$iBu, Al(Me)$_2$Et, AlMe(Et)$_2$, AlMe(iBu)$_2$, Al(CH$_2$—CH(Me)CH(Me)$_2$)$_3$, Al(Me)$_2$iBu, Al(Me)$_2$Cl, Al(Et)$_2$Cl, AlEtCl$_2$ and Al$_2$(Et)$_3$Cl$_3$, wherein Me=methyl, Et=ethyl, iBu=isobutyl, iHex=isohexyl, iOct=2,4,4-trimethyl-pentyl.

Amongst the above aluminium compounds, trimethylaluminium (TMA), triisobutylaluminium (TIBAL) and tris(2,4,4-trimethyl-pentyl)aluminium (TIOA) are preferred.

The alumoxanes used in the catalyst according to the invention are considered to be linear, branched or cyclic compounds containing at least one group of the type:

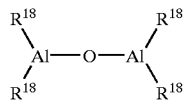

wherein the substituents $R^{18}$, same or different, are $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optional hydrogen atoms, silicon or germanium atoms, or a —O—Al($R^{18}$)$_2$ group and, if appropriate, some substituents $R^{18}$ can be halogen atoms.

In particular, alumoxanes of the formula:

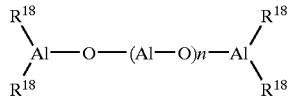

can be used in the case of linear compounds, wherein n is 0 or an integer of from 1 to 40 and the substituents $R^{18}$ are defined as above, or alumoxanes of the formula:

can be used in the case of cyclic compounds, wherein n is an integer of from 2 to 40 and the $R^{18}$ substituents are defined as above.

The substituents $R^{18}$ are preferably ethyl, isobutyl or 2,4,4-trimethyl-pentyl groups.

Examples of alumoxanes suitable for use according to the present invention are methylalumoxane (MAO), isobutylalumoxane (TIBAO), 2,4,4-trimethyl-pentylalumoxane (TIOAO) and 2,3-dimethylbutylalumoxane.

The molar ratio between the aluminium and the metal of the metallocene compound is in general comprised between 10:1 and 20000:1, and preferably between 100:1 and 5000:1.

Non-limiting examples of compounds able to form an alkylmetallocene cation are compounds of the formula $Y^+Z^-$, wherein $Y^+$ is a Bronsted acid, able to donate a proton and to react irreversibly with a substituent X of the compound of the formula (I), and $Z^-$ is a compatible anion which does not coordinate and which is able to stabilize the active catalytic species which results from the reaction of the two compounds and which is sufficiently labile to be displaceable by an olefin substrate. Preferably, the anion $Z^-$ consists of one or more boron atoms. More preferably, the anion $Z^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred. Moreover, compounds of the formula $BAr_3$ can conveniently be used. Compounds of this type are described, for example, in the published International patent application WO 92/00333, the content of which is incorporated in the present description.

The catalysts of the present invention can also be used on supports. This is achieved by depositing the metallocene compound (A) or the product of the reaction thereof with the component (B), or the component (B) and then the metallocene compound (A) on supports such as, for example, silica, alumina, magnesium halides, styrene/divinylbenzene copolymers, polyethylene or polypropylene.

A suitable class of supports which can be used is that constituted by porous organic supports finctionalized with groups having active hydrogen atoms. Particularly suitable are those in which the organic support is a partially cross-linked styrene polymer. Supports of this type are described in European application EP-633 272.

Another class of inert supports particularly suitable for use according to the invention is that of the olefin, particularly propylene, porous prepolymers described in International application WO 95/26369.

A further suitable class of inert supports for use according to the invention is that of the porous magnesium halides such as those described in International application WO 95/32995. The solid compound thus obtained, in combination with the further addition of the alkylaluminium compound either as such or prereacted with water if necessary, can be usefully employed in the gas-phase polymerization.

By polymerizing ethylene with alpha-olefins in the presence of the above particular metallocenes it is possible to obtain in high yields, at temperature of industrial interest (i.e. higher than 50° C.), ethylene copolymers having an extremely homogeneous distribution of thecomonomers in the polymeric chain, i.e. the number of sequences of two or more consecutive units of the alpha-olefin derived units is very low. The analysis of the distribution of the alpha-olefins in the copolymers of the invention has been carried out using $^{13}$C-NMR spectroscopy. The assignments, in the case of ethylene/1-hexene copolymers, were carried out as described by J. C. Randall in "Macromol. Chem. Phys. (1989), 29, 201.

The process for the polymerization of olefins according to the invention can be carried out in the liquid phase in the presence or absence of an inert hydrocarbon solvent, or in the gas phase. The hydrocarbon solvent can either be aromatic such as toluene, or aliphatic such as propane, hexane, heptane, isobutane or cyclohexane.

The polymerization temperature is generally comprised between −100° C. and +100° C. and, particularly between 10° C. and +90° C. The polymerization pressure is generally comprised between 0,5 and 100 bar.

The lower the polymerization temperature, the higher are the resulting molecular weights of the polymers obtained.

The polymerization yields depend on the purity of the metallocene compound of the catalyst. The metallocene compounds obtained by the process of the invention can therefore be used as such or can be subjected to purification treatments.

The components of the catalyst can be brought into contact each other before the polymerization. The pre-contact concentrations are generally between 1 and $10^{-8}$ mol/l for the metallocene component (A), while they are generally between 10 and $10^{-8}$ mol/l for the component (B). The pre-contact is generally effected in the presence of a hydrocarbon solvent and, if appropriate, of small quantities of monomer. In the pre-contact it is also possible to use a non-polynerizable olefin such as isobutene, 2-butene and the like.

In the copolymers obtainable with the process of the invention, the content by mole of ethylene derived units is generally higher than 50%, and preferably it is comprised between 80% and 99%.

The molar content of alpha-olefin derived units is preferably comprised between 0% and 50% and, more preferably, between 1% and 20%.

The content of polyene derived units is preferably comprised between 0% and 4% and, more preferably between 0% and 3%.

Non-limiting examples of alpha-olefins which can be used as comonomers in the process of the invention are propylene, 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene, 1-eicosene and allylcyclohexane.

Non-limiting examples of cycloolefins olefins which can be used as comonomers in the process of the invention are cyclopentene, cyclohexene and norbornene.

The copolymers according to the invention can also contain units derived from polyenes.

The polyenes which can be used as comonomers in the copolymers according to the present invention are comprised in the following classes:

non-conjugated diolefins able to cyclopolymerize such as, for example, 1,5-hexadiene, 1-6-heptadiene, 2-methyl-1,5-hexadiene;

dienes capable of giving unsaturated monomeric units, in particular conjugated dienes such as, for example, butadiene and isoprene, and linear non-conjugated dienes, such as, for example, trans 1,4-hexadiene, cis 1,4-hexadiene, 6-methyl-1,5-heptadiene, 3,7-dimethyl-1,6-octadiene, 11-methyl-1,10-dodecadiene.

In the case of polyenes other than non-conjugated alpha-omega-diolefins having 6 or more carbon atoms, these are preferably used in quantities of between 0 and 3 mol % as a second alpha-olefin comonomer.

A particular interesting embodiment of the present invention is constituted of copolymers of ethylene with 1-hexene or higher alpha-olefins.

The copolymers according to the present invention are characterized by an extremely homogeneous distribution of the comonomers in the polymeric chain and, more precisely, by the fact of containing an extremely low number of sequences of two ore more consecutive alpha-olefin units.

The analysis of the distribution of the comonomer units in the copolymers of the invention has been carried out by means of $^{13}$C-NMR spectroscopy. The assignments were carried out as described by Randall in Macromol.Chem.Phys. 1989, 29, 201. The distribution of triads, in the case of ethylene/1-hexene, are calculated by the following relationship:

$HHH=T_{\beta\beta} EHE=T_{\delta\delta} HHE=T_{\beta\delta} HEH=S_{\beta\beta} HEE=S_{\beta\delta}$ $EEE=0.5(S_{\delta\delta}+0.5S_{\gamma\delta})$ wherein EHE, HHE and HHH represent the sequence ethylene/1-hexene/ethylene, 1-hexene/1-hexene/ethylene and 1-hexene/1-hexene/1-hexene respectively in the copolymer. For the NMR nomenclature, see J. Carmen, R. A. Harrington, C. E. Wilkes, Macromolecules, 10, 537 (1977). The values are normalized. The higher the number of isolated 1-hexene units in the polymeric chain, the more the values of the ratio EHE/(EHE+HHE+HHH) become closer to the unit.

The number of 1-hexene sequences seems to be a function of the amount of 1-hexene units present in the chain.

The tables 2 and 3 refer to ethylene/1-hexene copolymers obtained with a process according to the present invention.

In particular, in table 2 there are reported the ratios EHE/(EHE+HHE+HHH) as a flnction of the molar percentage of 1-hexene in the chain for ethylene/1-hexene copolymers obtained with a process according to the present invention, in the presence of the above reported metallocene compounds. The amounts of 1-hexene units being equal, the values of the ratio EHE/(EHE+HHE+HHH) for the copolymers of the invention are always higher than those for the copolymers obtained with metallocenes used in the comparative examples, reflecting the improved distribution of 1-hexene units in the chain.

In the copolymers according to the present invention, the product of the reactivity ratios $r_1 \cdot r_2$, wherein $r_1$ is the relative reactivity of the comonomer versus ethylene and $r_2$ that of ethylene versus the comonomer, appears to be extremely low. In particular, it is generally lower than 0.30, preferably lower than 0.20, more preferably lower than 0.15. The diads were calculated from the triads distribution.

In the case of ethylene/1-hexene, the product of the reactivity ratios $r_1 \cdot r_2$ are calculated according to the following formulae as described in J. Uozomi, K. Soga, Mak. Chemie, 193, 823, (1992):

$r_1=2EE/(EH)X$ $r_1 \cdot r_2=4(EEHH)/EH^2,$ wherein
X=[E]/[H] monomer molar ratio in the polymerization bath.

In particular, the ratio EHE/(EHE+HHE+HHH) satisfies the following relationship:

$EHE/(EHE+HHE+HHH) \geq 0,75$ preferably:

$EHE/(EHE+HHE+HHH) \geq 0,85$ more preferably $EHE/(EHE+HHE+HHH) \geq 0,9.$

The copolymers of the present invention have intrinsic viscosity values (I.V.) generally higher than 0.5 dl/g and preferably higher than 1.0 dl/g. The intrinsic viscosity can reach values of 3.0 dl/g and even higher.

The molecular weight of the polymers can be also varied by varying the type or the concentration of the catalyst components or using molecular weight regulators such as, for example, hydrogen.

Generally, the copolymers of the present invention are endowed with a narrow molecular weight distribution. The molecular weight distribution is represented by the ratio $M_w/M_n$ which, for the copolymers of the present invention, when the metallocene used is a pure isomer, is generally lower than 4, preferably lower than 3.5 and, more preferably, lower than 3.

The molecular weight distribution can be varied by using mixtures of different metallocene compounds or by carrying out the polymerization in several stages at different polymerization temperatures and/or different concentrations of the molecular weight regulators.

The copolymers of the invention are transformable into shaped articles by conventional thermoplastic material processing (molding, extrusion, injection etc.).

The following examples are given for illustrative purposes and are not intended to limit the scope of the invention.

GENERAL PROCEDURES AND CHARACTERIZATIONS

The following abbreviations are used:

THF=tetrahydrofuran $Et_2O$=ethyl ether

NaOEt=sodium ethoxide $^tBuOK$=potassium tert-butoxide

DMSO=dimethyl sulfoxide

DMF=N,N-dimethylformamide

BuLi=butyllithium

All operations were performed under nitrogen by using conventional Schlenk-line techniques. Solvents were distilled from blue Na-benzophenone ketyl ($Et_2O$), $CaH_2$ ($CH_2Cl_2$), or $AliBu_3$ (hydrocarbons), and stored under nitrogen. BuLi (Aldrich) was used as received.

The $^1$H-NMR analyses of the metallocenes were caried out on an DPX 200 Bruker spectrometer ($CD_2Cl_2$, referenced against the middle peak of the triplet of residual $CHDCl_2$ at 5.35 ppm). All NMR solvents were dried over $P_2O_5$ and distilled before use. Preparation of the samples was carried out under nitrogen using standard inert atmosphere techniques.

The $^{13}$C-NMR and $^1$H-NMR analyses of the polymers were carried out on a Bruker DPX 400 spectrometer operating at 400.13 MHz and 100.61 MHz respectively. The samples were analyzed as solutions in tetrachlorodideuteroethane at 120° C.

The intrinsic viscosity (I.V.) was measured in tetralin at 135° C.

The melting points of the polymers (Tm) were measured by Differential Scanning Calorimetry (D.S.C.) on an instrument DSC Mettler, according to the following method. About 10 mg of sample obtained from the polymerization were cooled to −25° C. and thereafter heated at 200° C. with a scanning speed corresponding to 20° C. minute. The sample was kept at 200° C. for 5 minutes and thereafter cooled to 0° C. with a scanning speed corresponding to 20° C./minute. Then, a second scanning was carried out with a scanning speed corresponding to 10° C./min. The values reported are those obtained in the second scanning.

The distribution of molecular weights was determined by GPC carried out on an instrument WATERS 150 in orthodichlorobenzene at 135° C.

PREPARATION OF THE METALLOCENES

The synthesis of rac-isopropylidene-bis(3-isopropyl-indenyl)zirconium dichloride (rac-$CMe_2(3$-iPr-Ind)$ZrCl_2$), rac-isopropylidene-bis(3-trimethylsilyl-indenyl)zirconium dichloride (rac-$CMe_2(3$-$Me_3$Si-Ind)$_2ZrCl_2$), rac-isopropylidene-bis(3-methyl-indenyl)zirconium dichloride (rac-$CMe_2(3$-Me-Ind)$_2ZrCl_2$), rac-isopropylidene-bis(3-tert-butyl-indenyl)zirconium dichloride (rac-$CMe_2(3$-tBu-Ind)$_2ZrCl_2$) was carried out as described in WO 96/22995.

Synthesis of rac-Methylene-bis(3-t-butyl-1-indenyl) zirconium Dichloride (a) Synthesis of t-butyl-Indene 42.0 g of indene (technical grade, 94 % by GC, 39.5 g, 340 mmol), 50 % w aqueous KOH (308 g in 308 nL) and 15.8 g of Adogen (Aldrich, 34 mnuol) dissolved in 139.7 g of tert-butylbromide (1019.6 mmol) were introduced in this order, at room temperature, in a 1 L, jacketed glass reactor with mechanical stirrer (Buïchi). The organic phase turns green. The mixture is heated to 60° C. and vigorously stirred for two hours (a pressure build-up to 2.5 bar-g is observed) and then cooled to room temperature. Total reaction time is 3 h. The organic phase is extracted with technical hexane (3×200mL) and analyzed by GC. Conversion: 74.5% w of 3-tert-butyl-indene and 1.8% of 1-tert-butyl-indene, unreacted indene 13.7% w. The solution was evaporated under reduced pressure (rotovac) and the resulting dark brown viscous liquid was distilled at 1 mmHg, collecting the fraction boiling between 70 and 80° C. (40 g, 76.8% of 3-tert-butyl-indene and 19.5% of 1-tert-butyl-indene, no indene).

(b) Synthesis of bis(3-t-butyl-Indenyl)methane

In a three neck, 1 L flask with stirring bar were introduced in this order: 10.32 g of $^tBuOK$ (92 mmol), 400 mL of DMF, 80.6 g of tert-butyl-indene (98.2% by GC, 460 mmol), and then 18.6 mL of aqueous formalin (37%, 6.9 g, 230 mmol) were added dropwise over 15 min. A mildly exothermic reaction is observed and the solution turns red. The mixture was stirred at room temperature for 2 hours, then the reaction was quenched by pouring the mixture on ice and $NH_4Cl$, extracted with $Et_2O$ (2×250 mL), concentrated under reduced pressure to yield an orange oily product with the following G.C. composition: 1-$^t$BuInd, 0.3%; 3-$^t$BuInd, 2.8%; target product, 78.3%; the rest being byproducts. Yield of raw product: 83.6 g, corresponding to a yield of 79.9%. The orange oily product crystallized upon standing (ca. 1 h). This product was further purified by washing with pentane, which leaves bis(1-tert-butyl-3-indenyl)methane as a light yellow powder, 99.8% pure by G.C.

(c) Synthesis of Methylene-bis(3-t-butyl-1-indenyl) zirconium Dichloride 11.0 g of pure bis(1-tert-butyl-3-indenyl)methane (30.9 mmol) were dissolved in 200 mL $Et_2O$ in a 250 mL Schlenk tube, and the solution cooled to −15° C. 40 mnL of 1.6 M BuLi in hexane (63.3 mmol) were added dropwise over 15 min with stirring. The solution is allowed to warm to room temperature and stirred for 4.5 hours. An increasing turbidity develops with final formation of a yellow suspension. 7.2 g of $ZrCl_4$ (30.9 mmol) were slurried in 200 mL pentane. The two mixtures were both cooled to −80° C. and the Li salt solution in $Et_2O$ were quickly added to the $ZrCl_4$ slurry in pentane. The cooling bath is removed. After 20 min the color of the slurry changes from yellow to red. The reaction mixture is stirred overnight at room temperature, and then brought to dryness under reduced pressure. The red powder was slurried in 200 mL of pentane and transferred into a filtration apparatus equipped with side arm (to allow solvent refluxing) connecting the system above and below the frit, a receiving flask on the bottom and bubble condenser on the top. The red solid was extracted with refluxing pentane for about 3.5 hours. The filtrate was evaporated to dryness under reduced pressure to give a red paste which contained rac-$CH_2(3$-$^tBu$-Ind)$_2ZrCl_2$ free from its meso isomer, but containing polymeric byproducts. The paste was washed twice with $Et_2O$ (20+10 mL) to give 1 g of pure product. The red solid on the frit was further extracted with $CH_2Cl_2$ until the filtrate was light orange (6 hours) and dried. $^1$H-NMR shows the presence of pure rac-CH$_2$(3-$^t$Bu-Ind)$_2$ZrCl$_2$ (7.25 g). Total yield (8.25 g of red powder) of rac-CH$_2$(3-$^t$Bu-Ind)$_2$ZrCl$_2$ is 52%. $^1$H NMR (CDCl$_3$, d, ppm): s, 1.41, $^t$Bu, 18H; s, 4.78, CH$_2$, 2H; s, 5.79, 2H, Cp-H; m, 7.15, 2H, m, 7.36, 2H; m, 7.47, 2H; m, 7.78, 2H.

Synthesis of Methylene-bis(3-iso-propyl-1-indenyl) ZrCl$_2$ (a) Synthesis of 3-iso-propyl-1-Indene 25 g of indene (Aldrich, 94.4%) in 140 mL Et$_2$O were placed in a 0.5 L flask and cooled to −20° C.; 141 mL of n-BuLi (1.6 M in hexane, 226 mmol) were added dropwise in about 30'. The reaction mixture was allowed to warm to room temperature and then stirred for 5 hours (brown-orange solution). This solution was then slowly added to a solution of 101 mL of i-PrBr (Aldrich, MW 123 g/mol, d=1.31 g/mL, 1.07 mol) in 140 mL Et$_2$O maintained at 0° C. The reaction was allowed to proceed with stirring at room temperature for 72 hours. Aliquots were taken for GC analysis after 24 h (Indene=12.1%, i-PrInd=56.5%, (i-Pr)$_2$Ind=18.8%), 48 h (Indene=4.6%, i-PrInd=66.8%, (i-Pr)$_2$Ind=16.5%), and final (Indene=4.8%, i-PrInd 65.3%, (i-Pr)$_2$Ind=16.8%). The mixture was poured onto 300 g of ice, the water layer was extracted with Et$_2$O (3×200 mL) and the Et$_2$O wash combined with the organic layer, dried over MgSO$_4$ and after filtration the solvent was removed under vacuum to leave 30.9 g of a yellow oil (yield based on GC analysis is 62%). 18 g of this oil was distilled (adding NaOH pellets to avoid polymerization, with a 20 cm vigreux column) collecting the fraction boiling at 95–105° C. at 10 mmHg, 10 g, GC: i-PrInd (2 isomers)=92.1%, (i-Pr)$_2$Ind= 6.7%. $^1$H NMR (CDCl$_3$, d, ppm): d, 1.45, 1.47, 6H; m, 3.47, CH, 1H; s, 3.47, 2H, CH$_2$; s, 6.35, 1H,; m, 7.47, 2H; m, 7.3–7.7, 4H. Major isomer is 3-i-Pr-indene.

(b) Synthesis of bis(3-iso-propyl-Indenyl)methane

In a three neck, 500 mL flask with stirring bar were introduced in this order: 10 g of i-Pr-indene (92%, MW 158, 58.3 mmol) dissolved in 250 mL of DMSO, and 1.42 g of t-BuOK (MW 112.82. 12.6 mmol). The yellow solution turns green. 2.56 mL of aqueous formalini (37%, MW 30.03, 31.6 mmol) in 70 mL of DMSO were added in 15'. A mildly exothermic reaction is observed and the solution turns dark brown. At the end of the addition the reaction mixture was stirred for 16 h at room temperature. The reaction was quenched by pouring the mixture on 200 g ice with 0.3 g NH$_4$Cl. The organic product was extracted with Et$_2$O, the water layer was washed with Et$_2$O (3×100 mL), the organic layers combined, dried over MgSO$_4$, filtered and concentrated to leave 13.65 g of yellow oil, which contains 32% of the desired product by CC analysis.

(c) Synthesis of Methylene-bis(3iso-propyl-indenyl)ZrCl$_2$ 13.6 g of raw bis(3-iso-propyl-1-indenyl)methane were dissolved in 200 mL Et$_2$O in a 250 mL Schlenk tube, and the solution cooled to −80° C. 33.3 mL of 2.5 M BuLi in hexane (83.2 mmol) were added dropwise over 15 min with stirring. The solution is allowed to warm to room temperature and stirred for 5 hours. An increasing turbidity develops with final formation of an orange precipitate. Et$_2$O was removed under vacuum and 200 mL of toluene were added. 9.7 g of ZrCl$_4$ (MW 233.03, 41.62 mmol) were slurried in 200 mL of toluene. The two mixtures were both cooled to −80° C. and the ZrCl$_4$ slurry in toluene was quickly added to the Li salt solution in toluene. The cooling bath is removed. The reaction mixture is stirred overnight at room temperature. Filtration: the residue was a sticky glue (eliminated). The filtrate was evaporated to 25 mL under reduced pressure: the solid precipitated was isolated by filtration: $^1$H NMR (CD$_2$Cl$_2$, d, ppm): 92% meso: ps-t, 1.31, i-Pr, 12H; quintet, 3.32, CH, 2H; quartet, 4.84, 4.91, 5.01, 5.08, 2H, CH$_2$-bridge; s, 5.81, 2H, Cp-H; t, 6.9–7.0, 2H; t, 7.06–7.15, 2H; m, 7.47–755, 4H. See FIG. 2. The filtrate was dried to give a red sticky solid (5.8 g), which was dispersed in 30 mL Et$_2$O and 2 mL CH$_2$Cl$_2$, and filtered at 0° C. The residue was dried to give 1 g of red powder. $^1$H-NMR shows the presence of chemically pure CH$_2$(3-i-Pr-Ind)$_2$ZrCl$_2$ (80% racemo, 20% meso). $^1$H NMR (CD$_2$Cl$_2$, d, ppm): d, 1.17, 1.21, CH3, 6H; d, 1.31,1.34, CH3, 6H; quintet, 3.13–3.20, CH, 2H; s, 4.82, 2H CH2-bridge; s, 5.78, 2H, Cp-H; t, 7.07–7.13, 2H; t, 7.25–7.30, 2H; d, 7.47–7.52, 2H; d, 7.60–7.65, 2H.

Synthesis of Methylene-bis(3-trimethylsilyl-1-indenyl)zirconium Dichloride (a) Synthesis of bis(1-trimethylsilyl-3-Indenyl)methane 9.56 g of bis(1-indenyl)methane (39,1 nmmol), obtained as reported in Synthesis 10, were dissolved in 70 ml Et$_2$O in a 250 ml Schlenk tube, and the solution cooled to −78° C. 33.0 ml of 2.5 M BuLi in hexane (82.5 mmol) were added dropwise, over 30 minutes under stirring. The obtained solution was allowed to warm to room temperature and then stirred for 3 hours, thus obtaining a brown dark, lightly cloudy solution.10.5 ml of chlorotrimethylsilane (82.7 mmol) were dissolved in 50 ml Et$_2$O. The two mixtures were both cooled to −78° C. and the Li salt solution in Et$_2$O was added, over 20 minutes, to the chlorotrimethylsilane solution in Et$_2$O; the color of the solution turned from brown to maroon. The cooling bath was removed and the reaction mixture was stirred overnight at room temperature. After 20 hours, the solution, lightly clearer, was quenched with a few ml of MeOH, filtered and concentrated, thus giving 11.28 g of bis(1-trimethylsilyl-3-indenyl)methane as a brown dark oil (74.2% yield, meso/rac=1/1).

$^1$H NMR (CDCl$_3$, δ, ppm): −0.04 to −0.03 (s, 18H, CH$_3$); 3.35–3.45 (m, 2H, CH or CH$_2$ bridge); 3.93–4.00 (bs, 2H, CH$_2$ bridge or CH); 6.30–6.40 (m, 2H, Cp—H); 7.10–7.50 (m, 8H).

(b) Synthesis of Methylene-bis(3-trimethylsilyl-1-indenyl)zirconium Dichloride CH$_2$(3-Me$_3$Si-Ind)$_2$ZrCl$_2$ 4.90 g of bis(1-trimethylsilyl-3-indenyl)methane (12.6 mmol), obtained as reported above, were dissolved in 70 ml Et$_2$O in a 250 ml Schlenk tube, and the solution was cooled to −70° C. 10.6 ml of 2.5 M BuLi in hexane (26.5 mmol) were added dropwise under stirring. The solution was allowed to warm to room temperature and stirred for 3 hours. An increasing turbidity developed with the final formation of a brown dark suspension. 2.94 g of ZrCl$_4$ (12.6 mmol) were slurried in 50 ml of pentane. The two mixtures were both cooled to −70° C. and the Li salt solution in Et$_2$O was quickly added to the ZrCl$_4$ slurry in pentane; then the cooling bath was removed. The reaction mixture was maintained under stirring overnight at room temperature and the color of the suspension turned to maroon. After filtration, the residue was concentrated and then extracted with toluene to give a pink-red powder. The $^1$H-NMR analysis showed the presence of meso/rac CH$_2$(3-Me,Si-1-Ind)$_2$ZrCl$_2$=75/25. The filtrate was dried to give a brown dark sticky soid and pentane was added; the obtained mixture was stirred at room temperature for 1 hour and then filtered. The residue was finally dried to give 1.87 g of an orange powder. The $^1$H-NMR analysis showed the presence of rac/meso CH$_2$(3-Me$_3$Si-1-Ind)$_2$ZrCl$_2$=81/19 (27.0% yield).

$^1$H NMR (CD$_2$Cl$_2$, δ, ppm): 0.22 (s, 6H, CH$_3$); 0.34 (s, 6H, CH$_3$); 4.79 (s, CH$_2$ bridge, 2H); 4.93 (q, CH$_2$ bridge, 2H); 6.47 (s, Cp-H, 2H); 6.57 (s, Cp-H, 2H); 7.06–7.72 (m, 16H).

POLYMERIZATION

Methylalumoxane (MAO)

A commercial (Witco) 10% toluene solution was dried in vacuum until a solid, glassy material was obtained which was finely crushed and further treated in vacuum until all volatiles were removed (4–6 hours, 0.1 mmHg, 50° C.) to leave a white, free-flowing powder.

Tris(2,4,4-Trimethyl-pentyl)aluminum (TIOA)

A commercial (Witco) sample was used diluted to a 1 M solution in the indicated solvent.

EXAMPLE 1

Ethylene/1-hexene Copolymerization

A 200 ml glass autoclave, provided with magnetic stirrer, temperature indicator and feeding line for the ethylene, was purified and fluxed with ethylene at 35° C. At room temperature 90 ml of heptane and 10 ml of 1-hexene were introduced. The catalytic system was separately prepared in 10 ml of heptane by consecutively introducing 0.22 ml of 1 M toluene solution of MAO and 0.1 mg ($2.04 \times 10^{-6}$ mol) of methylene-bis(3-iso-propyl-1-indenyl)zirconium dichloride solved in the lowest possible amount of toluene. After 5 minutes stirring, the solution was introduced into the autoclave under ethylene flow, the reactor was closed, the temperature was risen to 70° C. and the reactor was pressurized to 4.5 bar with ethylene. The total pressure was kept constant by feeding ethylene. After 15 minutes the polymerization was stopped by cooling, degassing the reactor and by the introduction of 1 ml of methanol. The product was washed with acidic methanol, than with methanol and finally dried in oven at 60° C. under vacuum. The yield was 3.59 g corresponding to an activity of 769.3 Kg/gZr.h. The intrinsic viscosity of the polymer was 1.22 dl/g.

The characterization data of the copolymer so obtained are shown in Table 2.

EXAMPLE 2

Example 1 was repeated, but with the difference that instead of 10 ml 1-hexene 5 ml 1-hexene were introduced.

The polymerization conditions are reported in Table 1.

The characterization data of the copolymer obtained are shown in Table 2.

EXAMPLE 3

Example 1 was repeated, but with the difference that instead of MAO, 0.27 mmols of TIOA/$H_2O$ (Al/$H_2O$=2.11 as molar ratio) were used. The yield was 0.73 g corresponding to an activity of 123.2 Kg/gZr.h. The intrinsic viscosity of the polymer was 2.58 dL/g.

The polymerization conditions are reported in Table 1.

The characterization data of the copolymer obtained are shown in Table 2.

EXAMPLE 4

Example 1 was repeated, except that 0.22 mmols of a 9:1 mixture of TIOA—O/MAO was used. TIOA—O was obtained at Al/$H_2O$=2.07 as molar ratio.

The polymerization conditions are reported in Table 1.

The characterization data of the copolymer obtained are shown in Table 2.

EXAMPLE 5

Example 1 was repeated, but with the difference that 0.12 mg $Me_2C(3\text{-}iPr\text{-}Ind)_2ZrCl_2$ and 0,24 mmols MAO were used.

The polymerization conditions are reported in Table 1.

The characterization data of the copolymer obtained are shown in Table 2.

EXAMPLE 6

Example 1 was repeated, except that 0.12 mg $CMe_2(3\text{-}i\text{-}Pr\text{-}Ind)_2ZrCl_2$ and 0.24 mmols of a 9:1 mixture of TIOA—O/MAO was used. TIOA—O was obtained at Al/$H_2O$=2.07 as molar ratio.

The polymerization conditions are reported in Table 1.

The characterization data of the copolymer obtained are shown in Table 2.

EXAMPLE 7

Example 1 was repeated, but with the difference that 0.2 mg $H_2C(3\text{-}Me_3Si\text{-}Ind)_2ZrCl_2$ was used.

The polymerization conditions are reported in Table 1.

The characterization data of the copolymer obtained are shown in Table 2.

EXAMPLE 8

Example 1 was repeated, except that 0.1 mg $CMe_2(3\text{-}Me\text{-}Ind)_2ZrCl_2$ was used, and that 0.23 mmols TIOA/$H_2O$ (Al/$H_2O$=2.07 as molar ratio) and no MAO was used.

The polymerization conditions are reported in Table 1.

The characterization data of the copolymer obtained are shown in Table 2.

EXAMPLE 9

Example 1 was repeated, but with the difference that 0.12 mg $Me_2C(3\text{-}Me_3Si\text{-}Ind)_2ZrCl_2$ was used.

The polymerization conditions are reported in Table 1.

The characterization data of the copolymer obtained are shown in Table 2.

EXAMPLE 10

Ethylene/1-octene Copolymerization

A 260 ml glass autoclave, provided with magnetic stirrer, temperature indicator and feeding line for the ethylene, was purified and fluxed with ethylene at 35° C. At room temperature were introduced 86 ml of heptane and 4.1 ml of 1-octene distilled over $LiAlH_4$. The catalytic system was prepared by consecutively introducing MAO (0.21 mmol. as 1M toluene solution) and 0,1 mg (0.000205 mg.at. Zr) of the metal locene of example 1 solved in toluene (the low amount as possible). After 5 minutes stirring, the solution was diluted to 10 ml with heptane and was introduced into the autoclave under ethylene flow, the reactor was closed, the temperature risen to 70° C. and pressurized to 4 bar. The total pressure was kept constant by feeding ethylene for 20 minutes. The polymerization was stopped by cooling, degassing the reactor and the introduction of 1 ml of methanol. The achieved polymer was washed with acidic methanol, than with methanol and dried in oven at 60° C. under vacuum. 1.68 g. of polymer was obtained (270 Kg/gZr/h) with the following characteristics: I.V.=1.82 dL/g; 1-octene= 5.73 mol.%, Tm=92.5° C.; ΔH=63 J/g;

Triad distribution in mol. %:[EXE]=5.73; [XXX]=0; [XXE]=0; [EXE]/$X_{tot}$=1. Where X has the meaning of 1-octene.

EXAMPLE 11

Ethylene/1-decene Polymerization

A 200 ml glass autoclave, provided with magnetic stirrer, temperature indicator and feeding line for the ethylene, was purified and fluxed with ethylene at 35° C. At room temperature were introduced 85 ml of heptane and 5 ml of 1-decene distilled over LiAlH$_4$. The catalytic system was prepared by consecutively introducing MAO (0.22 mmol. as 1M toluene solution) and 0,1 mg (0.000205 mg.at. Zr) of the metallocene of example 1 solved in toluene (the low amount as possible). After 5 minutes stirring, the solution was diluted to 10 ml with heptane and was introduced into the autoclave under ethylene flow, the reactor was closed, the temperature risen to 70° C. and pressurized to 4 bar. The total pressure was kept constant by feeding ethylene for 10 minutes. The polymerization was stopped by cooling, degassing the reactor and the introduction of 1 ml of methanol. The achieved polymer was washed with acidic methanol, than with methanol and dried in oven at 60° C. under vacuum. 3.2 g. of polymer were obtained (1045 Kg/gZr/h) with the following characteristics: I.V.=2.01 dL/g; 1-decene=7.48 mol. %, Tm=72.8° C.; ΔH=63 J/g; Triad distribution in mol. %:[EXE]=7.48; [XXX]=0; [XXE]=0; [EXE]/X$_{tot}$=1. X has the meaning of 1-decene.

EXAMPLE 12 (comparison)

Example 1 was repeated except that rac-CH$_2$(3-tBu-Ind)$_2$ZrCl$_2$ was used.

The polymerization conditions are reported in Table 1.

The characterization data of the copolymer obtained are shown in Table 2.

EXAMPLE 13 (comparison)

Example 1 was repeated except that 0.3 mg rac-CMe$_2$(3-tBu-Ind)$_2$ZrCl$_2$ and 1.15 mmol TIOA/H$_2$O (Al/H$_2$O=4.18 as molar ratio), and that 15 ml of 1-hexene were used.

The polymerization conditions are reported in Table 1.

The characterization data of the copolymer obtained are shown in Table 2.

EXAMPLE 14 (comparison)

Example 1 was repeated except that rac-CMe$_2$(Ind)$_2$ZrCl$_2$ was used.

The polymerization conditions are reported in Table 1.

The characterization data of the copolymer obtained are shown in Table 2.

EXAMPLE 15 (comparison)

Example 1 was repeated except that rac-CH$_2$(Ind)$_2$ZrCl$_2$ was used.

The polymerization conditions are reported in Table 1.

The characterization data of the copolymer obtained are shown in Table 2.

TABLE 1

| Example | zirconocene dichloride | Al/Zr | 1-hexene (ml) | Time (min) | yield (g) | Activity (Kg/g$_{Zr}$/h) |
|---|---|---|---|---|---|---|
| 1 | CH$_2$(3-iPr-Ind)$_2$ | 0.1 | 1000 | 10 | 15 | 3.59 | 769.3 |
| 2 | " | 0.1 | 1000 | 5 | 10 | 4.12 | 1324.4 |
| 3 | " | 0.1 | 1000 | 5 | 15 | 0.73 | 123.2 |
| 4 | " | 0.1 | 1000 | 5 | 10 | 1.43 | 460 |
| 5 | CMe$_2$(3-iPr-Ind)$_2$ | 0.1 | 1000 | 5 | 10 | 3.01 | 852.6 |
| 6 | " | 0.1 | 1000 | 10 | 15 | 0.67 | 126.5 |
| 7 | CH$_2$(3-Me$_3$Si-Ind)$_2$ | 0.2 | 1000 | 10 | 15 | 1.96 | 236 |
| 8 | CMe$_2$(3-Me-Ind)$_2$ | 0.1 | 1000 | 10 | 10 | 6 | 1818.0 |
| 9 | CMe$_2$(3-Me$_3$Si-Ind)$_2$ | 0.1 | 1000 | 10 | 10 | 1.38 | 436.4 |
| 12 (comp.) | CH$_2$(3-tBu-Ind)$_2$ | 0.1 | 1000 | 10 | 10 | 1 | 339.9 |
| 13 (comp.) | CMe$_2$(3-tBu-Ind)$_2$ | 0.3 | 2000 | 15 | 20 | 0.67 | 40.0 |
| 14 (comp.) | CMe$_2$(Ind)$_2$ | 0.1 | 1000 | 10 | 15 | 2.28 | 297.6 |
| 15 (comp.) | CH$_2$(Ind)$_2$ | 0.1 | 1000 | 10 | 15 | 1.68 | 295.0 |

TABLE 2

| Ex. | Zirconocene dichloride | 1-hexene (% mols) | N.M.R. EHE (% mols) | HHH | HHE | EHE/(EHE + HHE + HHH) | $r_1$ | $r_1 \cdot r_2$ | I.V. (dl/g) | Tm (° C.) | ΔH (J/g) |
|---|---|---|---|---|---|---|---|---|---|---|---|
| 1 | CH$_2$(3-iPr-Ind)$_2$ | 17.86 | 16.8 | 0 | 1.06 | 0.94 | 6.41 | 0.113 | 1.22 | n.d.# | n.d.# |
| 2 | " | 12.35 | 11.98 | 0 | 0.37 | 0.97 | 5.2 | 0.091 | 1.61 | 57.5 | 29 |
| 3 | " | 6.91 | 6.91 | 0 | 0 | 1 | 10.0 | n.d. | 2.58 | 74.8 | 58 |
| 4 | " | 7.27 | 7.27 | 0 | 0 | 1 | 9.83 | n.d. | 2.49 | 76.0 | 65.9 |
| 5 | CMe$_2$(3-iPr-Ind)$_2$ | 9 | 9 | 0 | 0 | 1 | 7.36 | n.d. | 2.1 | 73 | 52 |
| 6 | " | 11.24 | 10.8 | 0 | 0.44 | 0.96 | 12.26 | 0.142 | 2.8 | 63.4 | 43.1 |
| 7 | CH$_2$(3-Me$_3$Si-Ind)$_2$ | 10.09 | 8.73 | 0 | 1.36 | 0.87 | 14.9 | 0.627 | 0.81 | 77.5 | 53.2 |
| 8 | CMe$_2$(3-Me-Ind)$_2$ | 18.41 | 17.6 | 0.22 | 0.59 | 0.96 | 6.25 | 0.105 | 0.5 | 44.7 | 5 |
| 9 | CMe$_2$(3-Me$_3$Si-Ind)$_2$ | 8.78 | 7.8 | 0 | 0.98 | 0.89 | 16.1 | 0.52 | 1.29 | 76 | 51 |
| 12 (comp) | CH$_2$(3-tBu-Ind)$_2$ | 5.01 | 3.66 | 0 | 1.35 | 0.73 | 35.6 | 3.160 | 2.59 | 98.6 | 99.9 |
| 13 (comp) | CMe$_2$(3-tBu-Ind)$_2$ | 8.16 | 5.92 | 0.21 | 2.03 | 0.73 | 32.4 | 2.193 | 1.36 | 88.3 | 79.4 |
| 14 (comp) | CMe$_2$(Ind)$_2$ZrCl$_2$ | 24.0 | 18.7 | 1.66 | 4.18 | 0.76 | 5.04 | 0.559 | 0.18 | oil | |
| 15 (comp) | CH$_2$(Ind)$_2$ZrCl$_2$ | 26.56 | 20.06 | 1.32 | 5.17 | 0.76 | 3.71 | 0.362 | 0.14 | oil | |

1$^{st}$ run Tm = 48°, ΔH = 3.8 J/g;
n.d. = not determinable due to the absence of HH sequences

What is claimed is:

1. A process for the preparation of copolymers of ethylene having a reactivity $r_1 * r_2$ lower than 0.30, wherein $r_1$ is the relative reactivity if the comonomer versus ethylene and $r_2$ is the relative reactivity of ethiylene, md an intrinsic viscosity (I.V.) higher than 0.5 dl/g measured in tertralin at 135° C., comprising the polymerization reaction of ethylene with at least one alpha-oleflin, and optionally with one or more polyenes, in the presence of a catalyst obtained by contacting:

(A) a metallocene compound of the formula (I):

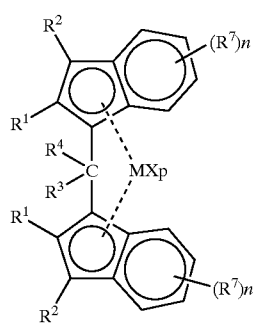

wherein
substituents $R^1$ are hydrogen atoms or $C_1$–$C_{10}$-alyl groups,
substituents $R^2$ are $CHR^{10}R^{11}$, $SiR^{12}R^{13}R^{14}$ or $GeR^{15}R^{16}R^{17}$ groups,
wherein $R^{10}$, $R^{11}$, $R^{12}$, $R^{15}$ are hydrogen atoms, $C_1$–$C_{20}$-alkyl, $C_3$–$C_{20}$-cycloalkyl, $C_2$–$C_{20}$-alkenyl, $C_6$–$C_{20}$-aryl, $C_7$–$C^{20}$-alkylaryl or $C_7$–$C_{20}$-arylalkyl radicals, optionally containing silicon or germanium atoms;
$R^{13}$, $R^{14}$, $R^{16}$, $R^{17}$ are $C_1$–$C_{20}$-arylakyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optionaly containing silicon or germanium atoms;
$R^3$ and $R^4$, same or different, are hydrogen atoms or $CHR^5W^6$ groups;
$R^3$ and $R^4$ can form a ring having 3 to 8 carbon atoms which can contain hetero atoms,
$R^5$ and $R^6$, same or different are hydrogen atoms, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, which can form a ring having 3 to 8 carbon atoms which can contain hetero atoms;
the $R^7$ substituents, same or different, are $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-anlkylaryl or $C_7$–$C_{20}$-alkylaryl radicals, optionally contaning silicon or germanium atoms; and optionally two adjacent $R^7$ substituents can form a ring comprising from 5 to 8 carbon atoms, n being an integer from 0 to 4;
M is a tradtion metal atom selected from the group consiing of the atoms of groups 3, 4, 5, 6, and the lanthanide and actinide groups of the Periodic Table of the Elements (new IUPAC version),
X same or different, is a mono anionic ligand selected from the group consisting of a hydrogen atom, a halogen atom, an $R^8$, $OR_8$, $OSO_2CF_3$, $OCOR^8$, $SR^8$, $NR^8_2$ and $PR^8_2$ group, wherein the substituents $R^8$ are a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containig silicon or germanium atoms,
p is an integer of from 0 to 3, being equal to the oxidation state of the metal M minus two; and (B) an aloxane andor a compound capable of fdrming an alkyl metallocene cation.

2. The process according to claim 1, wherein said alumoxane is obtained by contacting water with an organo-aluminium compound of formula $AlR^9_3$ or $Al_2R^9_6$, wherein the $R^9$ substituents, same or different from each other, are defined as $R^1$.

3. The process according to claim 1, wherein the molar ratio between the aluminium and water is in the range of 1:1 and 100:1.

4. The process claim 1, wherein said alumoxane is MAO, TIBAO or TIOAO, and said organo-aluminium compound is TIOA, TMA and/or TIBA.

5. The process according to claim 1, wherein the compound capable of forming a metallocene alkyl cation is a compound of formula $Y^+Z^-$, wherein $Y^+$ is a Bronsted acid, able to give a proton and to react irreversibly with a substituent X of the metallocene of formula (I) and $Z^-$ is a compatible anion, which does not coordinate, which is able to stabilize the active catalytic species originating from the reaction of the two compounds, and which is sufficiently liable to be able to be removed from an olefinic substrate.

6. The process according to claim 5, wherein the anion Z comprises one or more boron atoms.

7. The process claim 1, wherein in the metallocene compound of formula (I) the transition metal M is selected from titanium, zirconium or hafnium.

8. The process claim 1, wherein in the metallocene compound of formula (I) the substituents $R^1$ and $R^7$ are hydrogen atoms.

9. The process according to claim 8, wherein in the metallocene compound of formula (I) the $R^2$ substituents are carbon, silicon or germanium atoms substituted with two alkyl, cycloalkyl, aryl, alkylaryl or arylalkylgroups having 1 to 10 carbon atoms.

10. The process claim 1, wherein in the metallocene compound of formula (I) the X substituents are chlorine atoms or methyl groups.

11. The process claim 1, wherein the metallocene compound of formula (I) is methylene-bis(3-isopropyl-indenyl) zirconium dichloride or isopropylidene-bis(3-isopropyl-indenyl)zirconium dichloride.

12. The process according to claim 1, wherein said process is carried out at a temperature comprised between −100 and +100° C. and at a pressure comprised between 0.5 and 100 bar.

13. The process claim 1, wherein the molar ratio between the aluminium and the metal of the metallocene compound is comprised between 10:1 and 20000:1.

14. The process claim 1, wherein the alpha-olefin is selected from the group consisting of propylene, 1-butene, 1-pentene, 1-hexene, 4-methyl-1-pentene, 1-octene, 1-decene and 1-dodecene.

15. The process claim 1, wherein the alpha-olefin is 1-hexene.

16. The process claim 1, wherein said process is used for the preparation of homo- and copolymers of ethylene.

17. A process for the preparation of copolymers of etiylene having a reaic ty $r_1*r_2$ lower than 0.30, wherein $r_1$ is the relative reactivity of the comonomer versus ethylene and $r_2$ is the relative reactivity of ethylene, and an intrinsic viscosity (I.V.) higher than 0.5 dl/g measured in tetralin at 135° C., comprising the polymerization reaction of ethylene with at least one alpha-olefin, and optionally with one or more polyones, in the presence of a catalyst obtained by contacting:

(A) a metallo cone compound of the formula (I);

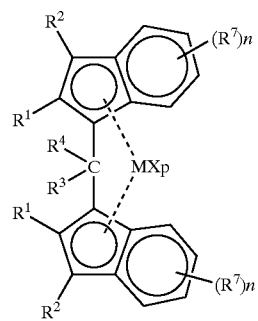

(I)

wherein
substituents $R^1$ are hydrogen atoms or $C_1$–$C_{20}$-alkyl groups,
substituents $R^2$ are $CHR^{10}R^{11}$, $SiR^{12}R^{13}R^{14}$ or $GeR^{15}R^{16}R^{17}$ groups, wherein: $R^{10}$, $R^{11}$, $R^{12}$, $R^{15}$ are hydrogen atoms, $C_1$–$C_{20}$-alkyl, $C_3$–$C_{20}$-cycloalkyl, $C_2$–$C_{20}$-alkenyl, $C_2$–$C_{20}$-alkenyl, $C_6$–$C_{20}$-aryl, $C_7$–$C_{20}$-alkylaryl or $C_7$–$C_{20}$-arylalkyl radicals, optionally containing silicon or germanium atoms;
$R^{13}$, $R^{14}$, $R^{16}$, $R^{17}$ are $C_1$–$C_{20}$-arylalkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optionally containing silicon or germanium atoms;
$R^3$ and $R^4$, same or different, ue hydrogen atoms or $CHR^5R^6$ groups;
$R^3$ and $R^4$ can form a ring having 3 to 8 carbon atoms which can contain betero atoms;
$R^5$ and $R^6$, same or different, are hydrogen atoms, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, which can form a ring having 3 to 8 carbon atoms which can contain hetero atoms;
the $R^7$ substituents, same or different, are $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optionally containing silicon or germanium atoms; and optionally two adjacent $R^7$ substituents can form a ring comprising from 5 to 8 carbon atoms, n being an integer from 0 to 4;
M is a transition metal atom selected from the group consisting of the atoms of groups 3, 4, 5, 6, and the lanthade and actnide groups of the Periodic Table of the Elements (new IUPAC version),
X, same or different, is a monoanionic ligand, and
p is an integer of from 0 to 3, being equal to the oxidation state of the metal M minus two; and (B) An Alumoxane and/or a Compound Capable of Forming an Alkyl Metallocene Cation.

* * * * *